United States Patent
Kito et al.

(10) Patent No.: US 9,902,259 B2
(45) Date of Patent: Feb. 27, 2018

(54) FUELING DEVICE

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 38 days.

(21) Appl. No.: 14/813,652

(22) Filed: Jul. 30, 2015

(65) Prior Publication Data

US 2016/0059692 A1 Mar. 3, 2016

(30) Foreign Application Priority Data

Aug. 29, 2014 (JP) ................................ 2014-175058

(51) Int. Cl.
*B60K 15/04* (2006.01)

(52) U.S. Cl.
CPC ........ *B60K 15/04* (2013.01); *B60K 2015/048* (2013.01)

(58) Field of Classification Search
CPC .............. B60K 15/04; B60K 2015/048; B60K 2015/0458
USPC .................................. 141/348–350; 220/86.2
See application file for complete search history.

(56) References Cited

U.S. PATENT DOCUMENTS

| 4,630,749 | A | * | 12/1986 | Armstrong | ............... B67D 7/54 141/59 |
| 4,632,270 | A | | 12/1986 | Sasaki et al. | |
| 4,759,458 | A | * | 7/1988 | Fischer | .................. B60K 15/04 138/109 |
| 4,941,587 | A | * | 7/1990 | Terada | .................. B60K 15/04 220/746 |

(Continued)

FOREIGN PATENT DOCUMENTS

| JP | S51-080514 U | 6/1976 |
| JP | 60-80930 A | 5/1985 |

(Continued)

OTHER PUBLICATIONS

Notification of Reasons for Refusal dated Jul. 4, 2017 in the corresponding JP patent application No. 2014-175058 (with English translation).

*Primary Examiner* — Nicolas A Arnett
(74) *Attorney, Agent, or Firm* — Posz Law Group, PLC

(57) ABSTRACT

There is provided a fueling device comprising a filler neck that forms a fuel path region on a filler port side in a fuel path from a filler port for a fuel to a fuel tank; and a mounting member that is mounted to the filler port side of the filler neck to receive a fuel gun. The filler neck includes an enlarged-diameter circumferential wall portion that is provided in upstream of a position where a leading end of the fuel gun inserted from the mounting member at the filler port is placed, and is enlarged outward in a radial direction relative to an opening-side path circumferential wall which is a fuel path circumferential wall on the filler port side, in (Continued)

order to expand a volume of the fuel path. This configuration causes the fuel to flow into a space formed by this enlarged-diameter circumferential wall portion and thereby reduces or suppresses the occurrence of the fuel overflow from the opening of the filler neck after a stop of fueling.

6 Claims, 9 Drawing Sheets

(56) References Cited

U.S. PATENT DOCUMENTS

| | | | | |
|---|---|---|---|---|
| 5,582,435 A | | 12/1996 | Goto et al. | |
| 5,735,322 A | * | 4/1998 | Palvolgyi | B60K 15/04 141/301 |
| 5,865,222 A | * | 2/1999 | Diamond | B67D 7/3209 114/343 |
| 6,648,033 B2 | * | 11/2003 | Gabbey | B60K 15/04 141/286 |
| 6,945,290 B1 | * | 9/2005 | Benjey | B60K 15/03504 141/302 |
| 7,048,019 B2 | * | 5/2006 | Pacitto, Jr. | B60K 15/04 141/286 |
| 7,059,365 B2 | * | 6/2006 | O'Connell | B60K 15/04 141/286 |
| 7,343,942 B2 | * | 3/2008 | O'Connell | B60K 15/04 141/286 |
| 7,360,565 B2 | * | 4/2008 | Peterson | B60K 15/04 141/285 |
| 7,617,851 B2 | * | 11/2009 | Barnes | B60K 15/03504 137/588 |
| 7,677,278 B2 | * | 3/2010 | Pacitto, Jr. | B60K 15/04 141/285 |
| 7,726,363 B2 | * | 6/2010 | Benjey | F02M 37/0082 141/198 |
| 7,997,307 B2 | * | 8/2011 | Benjey | B60K 15/04 141/350 |
| 8,056,589 B2 | * | 11/2011 | Novak | B60K 15/04 141/198 |
| 8,960,473 B2 | * | 2/2015 | Grun | B60K 15/03504 137/588 |
| 9,315,098 B2 | * | 4/2016 | Lee | B60K 15/03519 |
| 9,315,099 B2 | * | 4/2016 | Whelan | B60K 15/04 |
| 2007/0289664 A1 | * | 12/2007 | Peterson | B60K 15/04 141/126 |
| 2015/0246610 A1 | * | 9/2015 | Kito | B60K 15/04 220/86.1 |

FOREIGN PATENT DOCUMENTS

| | | |
|---|---|---|
| JP | 8-40091 A | 2/1996 |
| JP | H08-049797 A | 2/1996 |

* cited by examiner

⇩ LOWER SIDE IN VERTICAL DIRECTION

⇩ LOWER SIDE IN VERTICAL DIRECTION

TO KH2

LOWER SIDE IN VERTICAL DIRECTION

TO KH2

FUELING DEVICE

CROSS-REFERENCE TO RELATED APPLICATION

The present application claims priority from Japanese application P2014-175058 filed on Aug. 29, 2014, the content of which is hereby incorporated by reference into this application.

BACKGROUND

1. Field

The invention relates to a fueling device.

2. Description of the Related Art

A fueling device used for automobile uses a metal retainer to hold a fuel gun during fueling from the fuel gun, and this metal retainer is mounted to an opening side of a filler neck made of a resin (see, for example, JP H08-40091A).

The fuel gun is inserted along a fueling path from an opening of the filler neck that is a retainer-mounting end and is held by the retainer. Fuel is supplied through the fuel gun held by the retainer. When the liquid level of the fuel reaches a leading end of the fuel gun, fueling is stopped in response to detection of the liquid level of the fuel by an internal sensor. The fuel reaching the housing of the fuel gun (i.e., the fuel remaining in the fuel gun) at a stop of fueling flows from the leading end of the fuel gun into the filler neck. In the state that the fuel gun is inserted through the filler port, the leading end of the fuel gun is generally away from the opening of the filler neck by a certain distance. There is accordingly a gap between the housing of the fuel gun and the filler neck in a filler neck path in the upstream of the leading end of the fuel gun. This provides a certain space (volume). This space accepts the fuel remaining in the fuel gun and accordingly avoids the overflow of the fuel from the opening of the filler neck. According to some vehicle configuration, however, an opening-side path region from the opening of the filler neck in the fuel path does not have a sufficient length. In such cases, this may result in insufficient insertable length of the fuel gun. The insufficient insertable length of the fuel gun shortens the length of the space along the fuel path and thereby provides the space of only an insufficient volume. The fuel remaining in the fuel gun is thus likely to be overflowed from the opening of the filler neck.

SUMMARY

In order to solve at least part of the problems described above, the invention may be implemented by the following aspects.

(1) According to one aspect of the invention, there is provided a fueling device that is configured to supply a fuel to a fuel tank. The fueling device comprises a filler neck that forms a fuel path region on a filler port side in a fuel path from the filler port for the fuel to the fuel tank; and a mounting member that is mounted to the filler port side of the filler neck to receive a fuel gun. The filler neck may include an enlarged-diameter circumferential wall portion that is provided in upstream of a position where a leading end of the fuel gun inserted from the mounting member at the filler port is placed, and is enlarged outward in a radial direction relative to an opening-side path circumferential wall which is a fuel path circumferential wall on the filler port side, in order to expand a volume of the fuel path.

In the fueling device of this aspect, the enlarged-diameter circumferential wall portion is provided to expand the volume of the fuel path. This enlarged-diameter circumferential wall portion is located in the upstream of the leading end of the inserted fuel gun in the fuel path. In the fueling device of this aspect, in the case that the fuel flows out from the fuel gun even after a stop of fueling, the fuel is flowed into a space formed by the enlarged-diameter circumferential wall portion. This reduces or suppresses the occurrence of the fuel overflow after a stop of fueling. If the enlarged-diameter circumferential wall portion is also located in the downstream of the opening-side path circumferential wall that holds the mounting member, in the fuel path, the change of the dimensions or the shape of the mounting member would not be required This may keep a commonality of the mounting member of the fueling device.

(2) In the fueling device of the above aspect, the filler neck may include a plurality of the enlarged-diameter circumferential wall portions provided at different positions along a path trajectory of the fuel path. This configuration more effectively reduce the occurrence of the fuel overflow after a stop of fueling.

(3) In the fueling device of the above aspect, the fuel path may be arranged to be inclined in use of the fueling device, and the filler neck may have the enlarged-diameter circumferential wall portion provided on a lower side in a vertical direction in the fuel path. This configuration makes the fuel flowing from the fuel gun more likely to flow into the enlarged-diameter circumferential wall portion after a stop of fueling and thus more effectively reduce the occurrence of the fuel overflow after a stop of fueling.

(4) In the fueling device of the above aspect, the filler neck may include the enlarged-diameter circumferential wall portion that is extended to the opening-side path circumferential wall, and the mounting member may be held by a rib in a region which the enlarged-diameter circumferential wall portion is extended to. This configuration causes the enlarged-diameter circumferential wall portion to be extended in a wider range to the opening-side path circumferential wall and thereby more effectively reduce the occurrence of the fuel overflow after a stop of fueling. The mounting member is held by the rib. This does not require a change in dimensions of the mounting member involved in holding the mounting member. This accordingly does not reduce the commonality of the mounting member.

DESCRIPTION OF THE PREFERRED EMBODIMENTS

Figure 1:
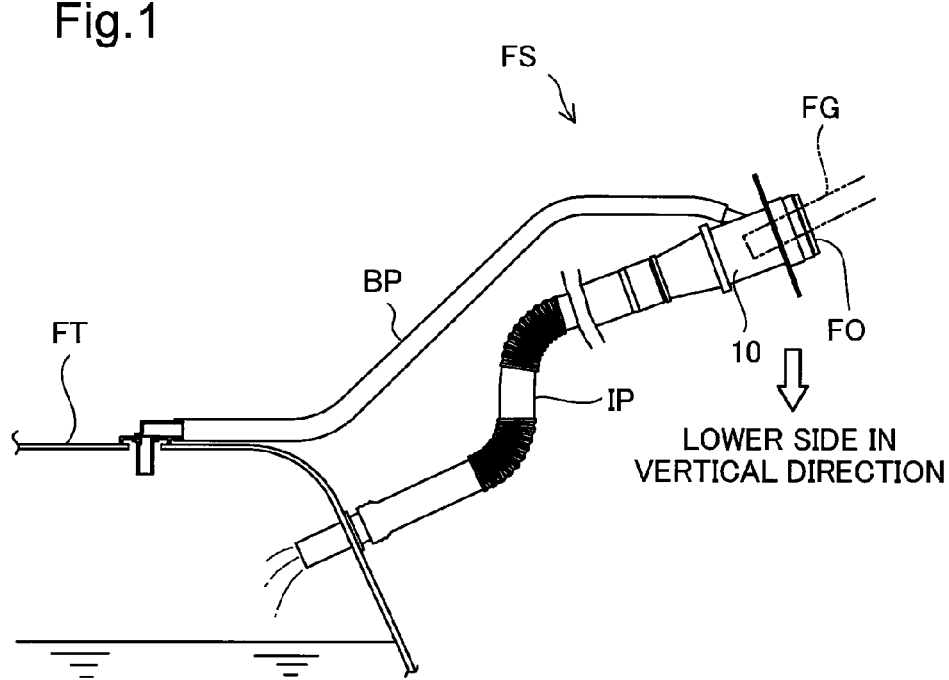
FIG. 1 is a sectional view illustrating the schematic configuration of a fueling device FS according to one embodiment of the invention.
Figure 2:
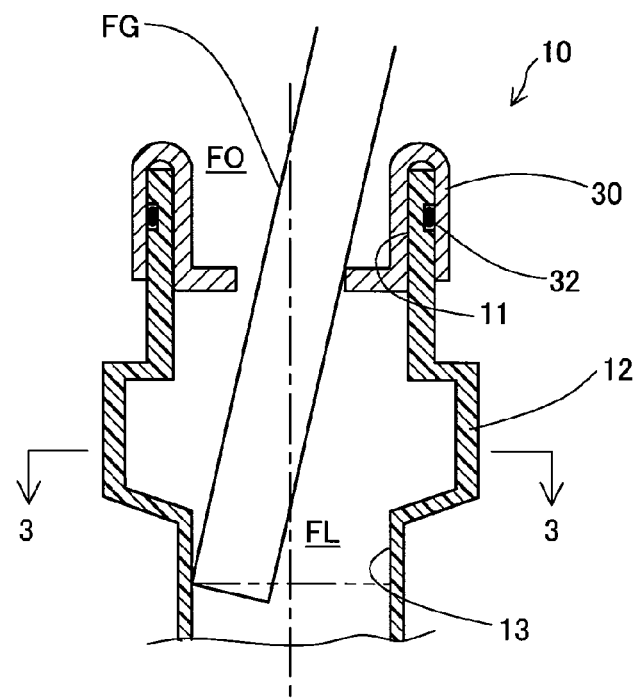
FIG. 2 is a diagram schematically illustrating the vertical section of a filler neck as a main member of the fueling device FS.

The following describes some embodiments of the invention with reference to drawings. FIG. 1 is a sectional view illustrating the schematic configuration of a fueling device FS according to one embodiment of the invention. FIG. 2 is a diagram schematically illustrating the vertical section of a filler neck 10 as a main member of the fueling device FS. The fueling device FS for a fuel tank according to this embodiment is configured to supply fuel fed through a fuel gun FG to a fuel tank FT and includes a filler neck 10 that has a filler port FO opened and closed by a fuel cap (not shown), an inlet pipe IP that is connected with one end of the filler neck 10 and is made of a metal or a resin, and a breather pipe BP that is provided to connect the fuel tank FT with the filler neck 10. In the fueling device FS, a fuel path FL from the filler port FO to the fuel tank FT is formed by the filler neck 10 and the inlet pipe IP connecting with the filler neck 10. The filler neck 10 is extended in an inclined manner from the filler port FO. In this configuration of the fueling device FS, when the fuel cap is detached for fueling and fuel is injected through the fuel gun FG into the filler neck 10, the fuel is supplied through the inlet pipe IP into the fuel tank FT. The breather pipe BP serves to return the fuel vapor in the fuel tank FT to the filler neck 10 and circulate the fuel vapor in the course of fueling. This reduces the fuel vapor generated in the fuel tank FT and ensures smooth fueling. A flow control valve (not shown) is mounted at an end of the breather pipe BP. The flow control valve serves to regulate the circulation amount of the fuel vapor flowing through the breather pipe BP with an increase in internal pressure of the tank during fueling.

The filler neck 10 is a member that forms a predetermined length of a fuel path region from the filler port FO-side in the fuel path FL from the filler port FO to the fuel tank FT. A retainer 30 is mounted on the filler port FO-side of the filler neck 10 as shown in FIG. 2. The retainer 30 is made of a metal material such as stainless steel to hold the fuel gun FG inserted through the filler port FO on the filler port FO-side. The retainer 30 is illustrated only schematically in the diagram of FIG. 2 but is more specifically shaped and configured such that the retainer 30 holds the inserted existing fuel gun FG, allows an existing fuel cap (not shown) to be mounted to the retainer 30, and is mounted to an end of the filler neck 10. The retainer 30 is formed in a folded-back shape along the entire circumference to allow an end of an opening-side path circumferential wall 11, which is a fuel path circumferential wall on the filler port FO-side of the filler neck 10, to be fit therein. Such folding-back structure forms a groove along the entire circumference. A seal member 32 is provided on an outer circumference at the end of the opening-side path circumferential wall 11. The retainer 30 mounted to the end of the opening-side path circumferential wall 11 is held in a liquid tight manner relative to the opening-side path circumferential wall 11.

The following describes the downstream-side configuration of the filler neck 10. The filler neck 10 is extended from the opening-side path circumferential wall 11 to the downstream side to form the fuel path FL. A circumferential wall of the fuel path FL at a position where a leading end of the fuel gun FG inserted through the filler port FO of the retainer 30 reaches is called downstream-side circumferential wall portion 13. An enlarged-diameter circumferential wall portion 12 is formed in the middle of the fuel path FL from the opening-side path circumferential wall 11 to the downstream-side circumferential wall portion 13. This enlarged-diameter circumferential wall portion 12 is a region of enlarged diameter in the fuel path circumferential wall and is extended radially outward relative to the opening-side path circumferential wall 11 and the downstream-side circumferential wall portion 13. Accordingly, the sectional area or the volume of the fuel path FL is increased in the region of the enlarged-diameter circumferential wall portion 12. The position of the leading end of the fuel gun FG shown in FIG. 2 is changed in the vertical direction of the drawing according to the depth of insertion of the fuel gun FG. FIG. 2 shows the position of the leading end of the fuel gun FG when the fuel gun FG is inserted to a substantially minimum insertion depth required for the fueling operation. The enlarged-diameter circumferential wall portion 12 should be provided in the upstream of this downstream-side circumferential wall portion 13.

Figure 3A:
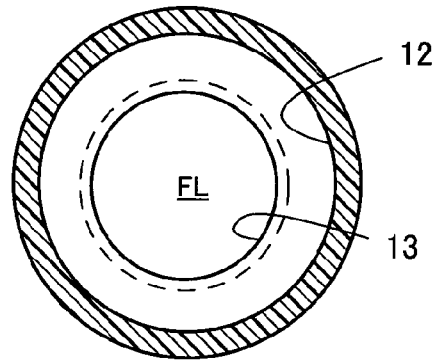
FIGS. 3A to 3C are diagrams illustrating some exemplary configurations of an enlarged-diameter circumferential wall portion in the sectional view taken on a line 3-3 in FIG. 2.
Figure 3B:
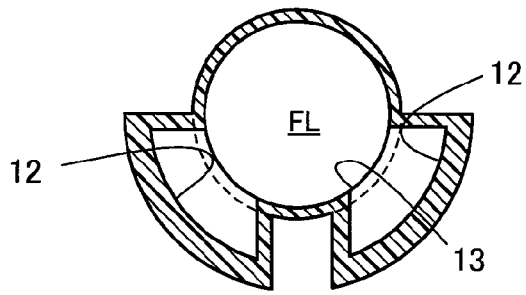
Figure 3C:
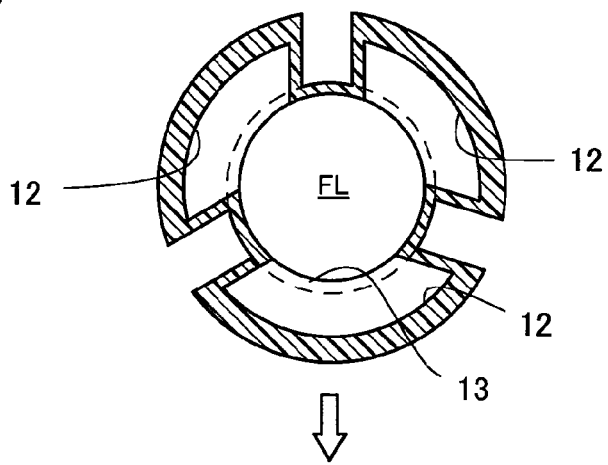

The enlarged-diameter circumferential wall portion 12 may be formed in any of various configurations. FIGS. 3A to 3C are diagrams illustrating some exemplary configurations of the enlarged-diameter circumferential wall portion 12 in the sectional view taken on a line 3-3 in FIG. 2. The enlarged-diameter circumferential wall portion 12 may be provided coaxially with the downstream-side circumferential wall portion 13 to be formed around the entire circumference about the axis as shown in FIG. 3A. The enlarged-diameter circumferential wall portion 12 may otherwise be provided coaxially with the downstream-side circumferential wall portion 13 to be formed only in partial areas about the axis as shown in FIGS. 3B and 3C. In the configuration formed in the partial area, the enlarged-diameter circumferential wall portion 12 is provided on the lower side in the vertical direction in the filler neck 10 extended in an inclined manner, i.e., in an inclined region of the fuel path FL as shown in FIG. 1. In FIG. 3B or 3C, spaces formed by respective parts of the enlarged-diameter circumferential wall portion 12 have an identical sectional shape. According to one modification, however, the enlarged-diameter circumferential wall portion 12 may be divided into a plurality of parts in different shapes, so that spaces formed by the respective parts of the enlarged-diameter circumferential wall portion 12 may have different sizes.

Figure 4:
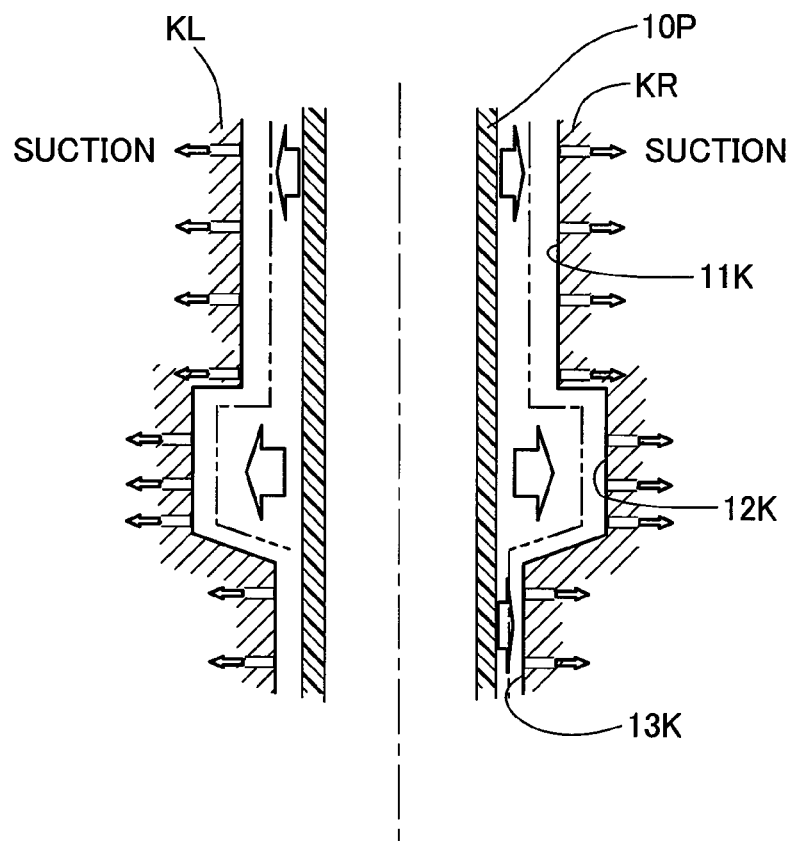
FIG. 4 is a diagram schematically illustrating a process of shaping the filler neck by blow molding.
Figure 5:
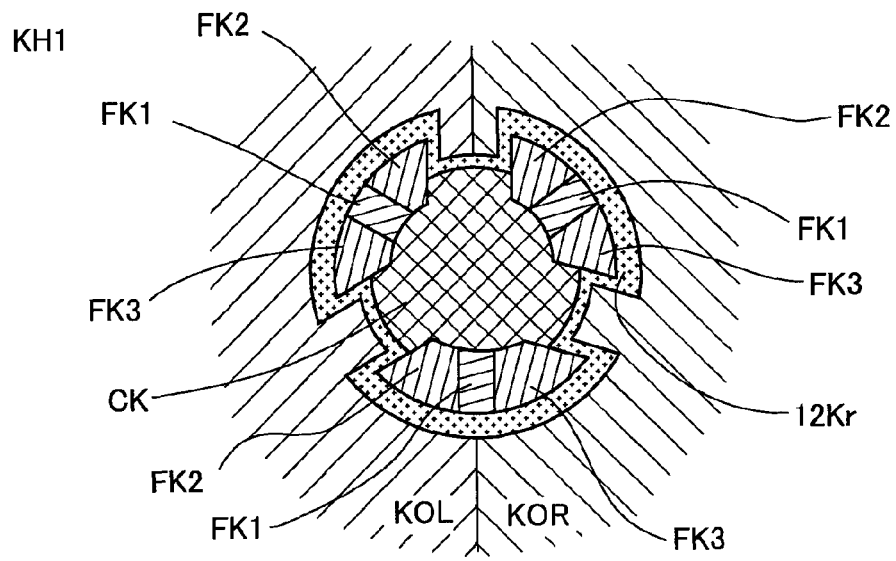
FIG. 5 is a diagram schematically illustrating a first process of removal of molds when the filler neck is molded by press molding or injection molding.
Figure 5:
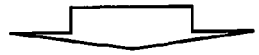
Figure 5:
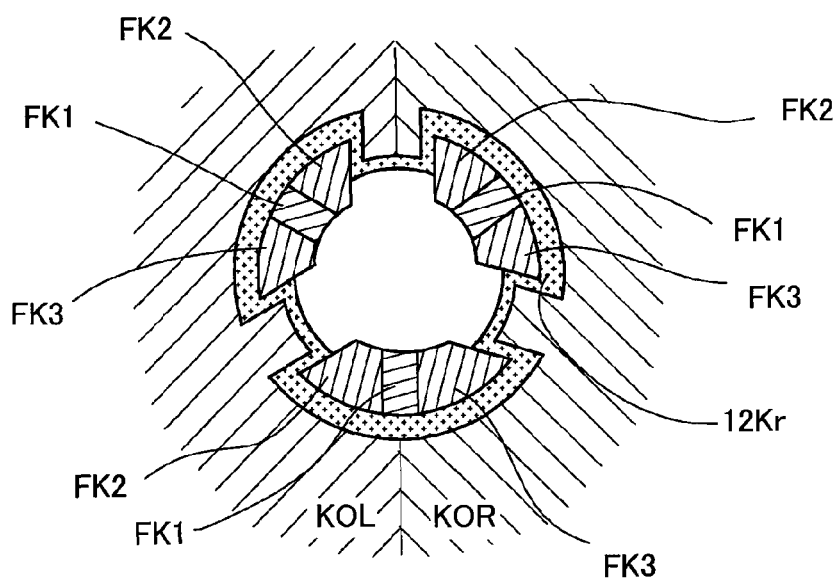
Figure 5:
Figure 6:
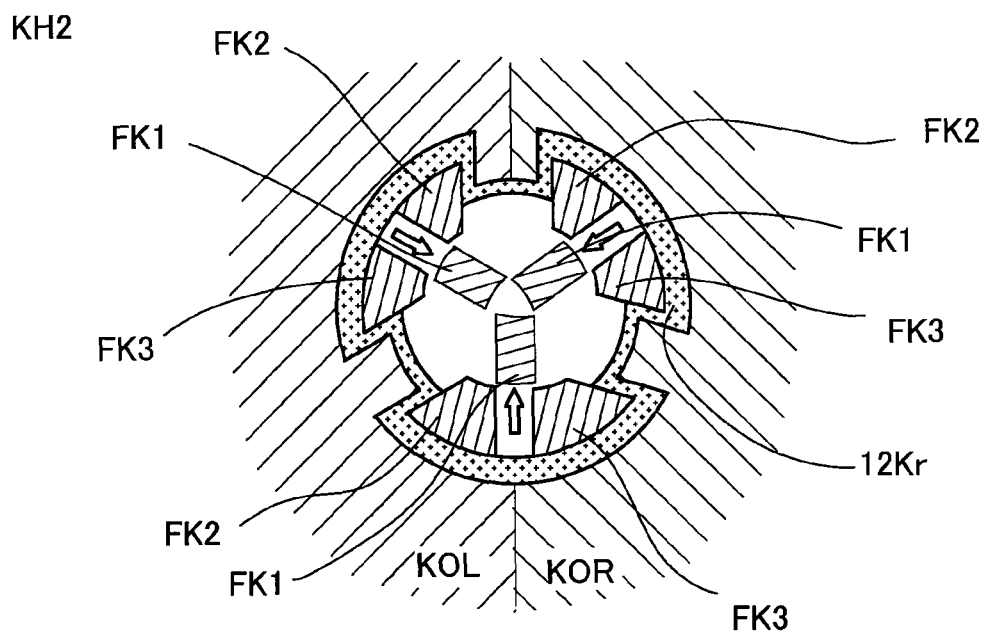
FIG. 6 is a diagram schematically illustrating a second process of removal of the molds.
Figure 6:
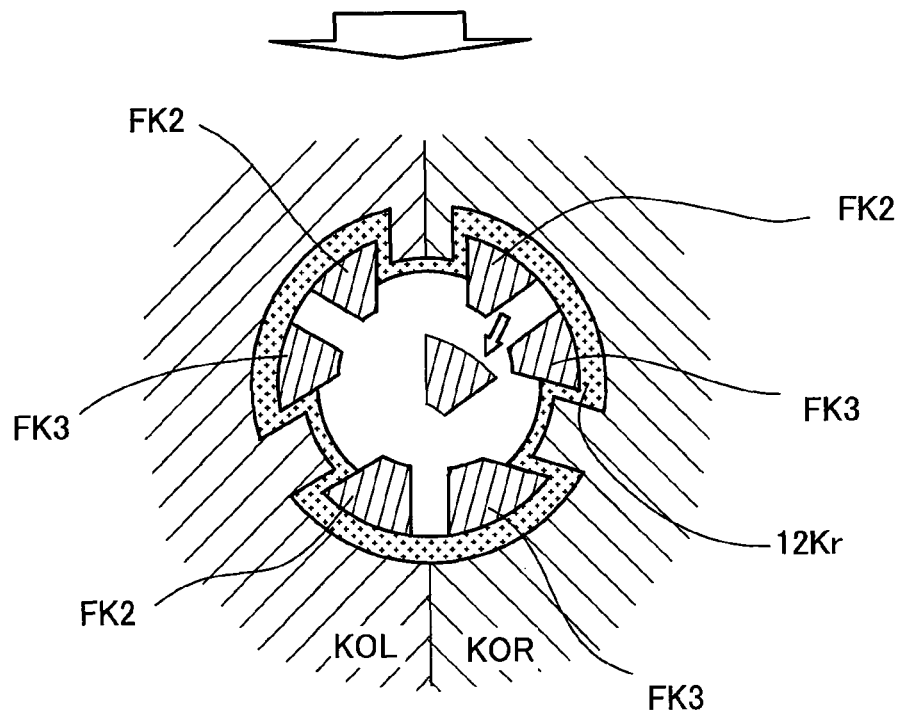

The enlarged-diameter circumferential wall portion 12 shown in FIG. 2 and FIGS. 3A to 3C is formed in the course of shaping and molding the filler neck 10. FIG. 4 is a diagram schematically illustrating a process of shaping the filler neck 10 by blow molding. FIG. 5 is a diagram schematically illustrating a first process of removal of molds when the filler neck 10 is molded by press molding or injection molding. FIG. 6 is a diagram schematically illustrating a second process of removal of the molds.

The process of blow molding shown in FIG. 4 uses split molds KL and KR for forming a cavity that includes a first cavity 11K for shaping the opening-side path circumferential wall 11, a second cavity 12K for shaping the enlarged-diameter circumferential wall portion 12 and a third cavity 13K for shaping the downstream-side circumferential wall portion 13. The split molds KL and KR are arranged such that a parison 10P which is to be shaped to form the filler neck 10 is surrounded by the above cavities 11K, 12K and 13K, and are sucked to make the parison 10P conform to the inner wall surface of the cavities 11k, 12K and 13K. Such blow molding forms the filler neck 10 having the enlarged-diameter circumferential wall portion 12 in any of various configurations shown in FIGS. 3A to 3C.

A molding process shown in FIGS. 5 and 6 regards shaping the enlarged-diameter circumferential wall portion 12 of the configuration shown in FIG. 3C and uses split molds KOL and KOR, a center core mold CK, enlarged-diameter shaping first core molds FK1, enlarged-diameter shaping second core molds FK2 and enlarged-diameter shaping third core molds FK3. The split molds KOL and KOR have mold surfaces for shaping the outer shape of the opening-side path circumferential wall 11, the enlarged-diameter circumferential wall portion 12 and the downstream-side circumferential wall portion 13 of the filler neck 10. These mold surfaces are combined with mold surfaces of the respective core molds to form cavities for the respective portions. The center core mold CK is split into a front-side split and a rear-side split relative to the sheet surface. The front-side split of the center core mold CK has a mold surface for shaping a circumferential-wall inner peripheral configuration of the opening-side path circumferential wall 11. The rear-side split of the center core mold CK has a mold surface for shaping a circumferential-wall inner peripheral configuration of the downstream-side circumferential wall portion 13. The front-side split and the rear-side split of the center core mold CK are combined with the first to the third core molds FK1 to FK3, such that the first to the third core molds FK1 to FK3 are placed between the front-side and the rear-side splits. The enlarged-diameter shaping first core molds FK1, the enlarged-diameter shaping second core molds FK2 and the enlarged-diameter shaping third core molds FK3 are combined with the split molds KOL and KOR to form an enlarged-diameter cavity 12Kr for shaping a circumferential-wall inner peripheral configuration of the enlarged-diameter circumferential wall portion 12. The enlarged-diameter shaping first core molds FK1, the enlarged-diameter shaping second core molds FK2 and the enlarged-diameter shaping third core molds FK3 respectively have regions entering the center core mold CK, which are formed by extending toward the front side of the sheet surface.

In a mold removal first process KH1 shown in FIG. 5, the front-side split and the rear-side split of the center core mold CK are pulled out toward the front side and the rear side of the sheet surface. This makes the enlarged-diameter shaping first core molds FK1, the enlarged-diameter shaping second core molds FK2 and the enlarged-diameter shaping third core molds FK3 in a freely-movable state, and a hollow space is formed by removal of the center core mold CK, as shown in the bottom drawing of FIG. 5. Subsequently, as shown in FIG. 6, in a mold removal second process KH2, the enlarged-diameter shaping first core molds FK1 are moved toward the hollow space and are pulled out toward the front side of the sheet surface. This leaves the enlarged-diameter shaping second core molds FK2 and the enlarged-diameter shaping third core molds FK3 as shown in the bottom drawing of FIG. 6. Either the enlarged-diameter shaping second core molds FK2 or the enlarged-diameter shaping third core molds FK3 are then moved toward the hollow space formed by removal of the center core mold CK and are pulled out toward the front side of the sheet surface. The remaining enlarged-diameter shaping second core molds FK2 or enlarged-diameter shaping third core molds FK3 are then removed. This completes removal of the molds. This provides the filler neck 10 having the enlarged-diameter circumferential wall portion 12 of the configuration shown in FIG. 3C. A procedure of newly producing the filler neck 10 assembles the molds in the reverse sequence to that of mold removal described above, sets the respective molds as shown in the top drawing of FIG. 5 and injects a resin into the cavity.

In the fueling device FS of the embodiment having the configuration described above, the enlarged-diameter circumferential wall portion 12 is provided between the opening-side path circumferential wall 11 and the downstream-side circumferential wall portion 13 of the filler neck 10. This enlarged-diameter circumferential wall portion 12 expands the volume of the fuel path FL. Accordingly, a space of a predetermined volume is formed by the enlarge-diameter circumferential wall portion 12. In the fueling device FS of this embodiment, the enlarged-diameter circumferential wall portion 12 is located in the upstream of the position where the leading end of the inserted fuel gun FG reaches, in the fuel path FL. In the fueling device FS of this embodiment, in the case that fuel flows out from the fuel gun FG even after a stop of fueling, a major part of the fuel is flowed into and accumulated in the space formed by the enlarged-diameter circumferential wall portion 12. This reduces or suppresses the occurrence of the fuel overflow after a stop of fueling. The enlarged-diameter circumferential wall portion 12 is located, on the other hand, in the downstream of the opening-side path circumferential wall 11 that holds the retainer 30, in the fuel path FL. Accordingly, there is no need to change the dimensions or the shape of the retainer 30 mounted to the filler port FO-side of the filler neck 10. The configuration of the fueling device FS of the embodiment does not reduce the commonality of the retainer 30. As a result, this allows a fuel cap generalized for any type of vehicle to be used in a conventional manner.

In the fueling device FS of this embodiment, the fuel path FL is extended in an inclined manner from the filler port FO, and the enlarged-diameter circumferential wall portion 12 is provided on the filler neck 10 that forms the inclined fuel path FL. The enlarged-diameter circumferential wall portion 12 is provided at least on the lower side in the vertical direction (as shown in FIGS. 3B and 3C). This configuration of the fueling device FS of the embodiment makes the fuel flowing out from the fuel gun FG after a stop of fueling more likely to flow into the space formed by the enlarged-diameter circumferential wall portion 12. This effectively reduces the occurrence of the fuel overflow after a stop of fueling.

In the fueling device FS of the embodiment, the enlarged-diameter circumferential wall portion 12 is provided on the filler neck 10. The filler neck 10 is, however, moldable by a conventional molding technique, such as blow molding, extrusion molding or injection molding. This ensures the mass productivity and suppresses the cost increase.

Figure 7:
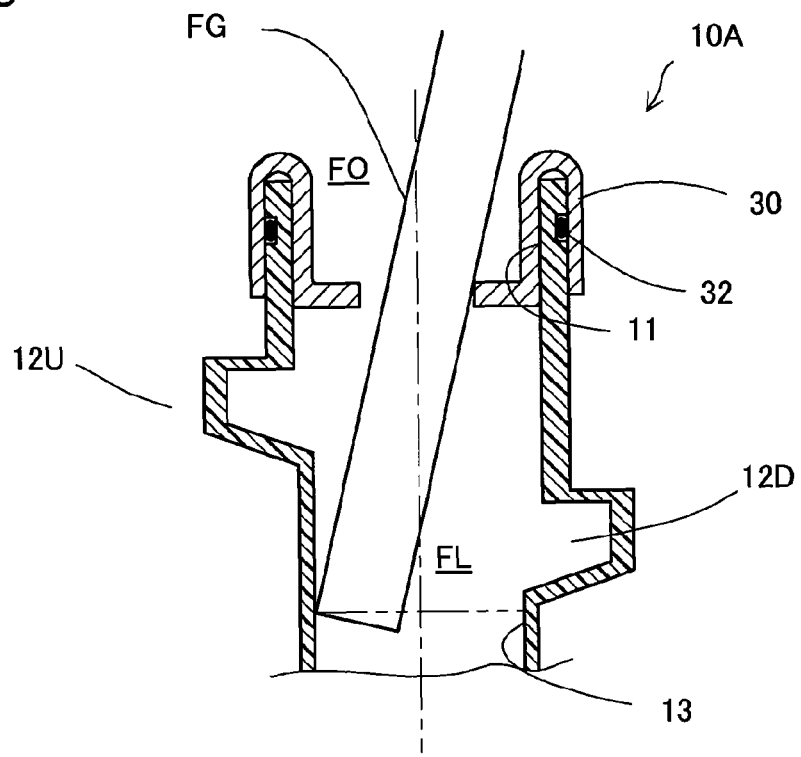
FIG. 7 is a diagram illustrating the vertical section of a main part of a filler neck in a fueling device according to a second embodiment.

The following describes other embodiments. FIG. 7 is a diagram illustrating the vertical section of a main part of a filler neck 10A in a fueling device according to a second embodiment. In the description below, portions and members having the same functions as those of the above embodiment are shown by the same signs with appropriate suffixes.

As illustrated, this filler neck 10A includes an enlarged-diameter circumferential wall portion 12U and an enlarged-diameter circumferential wall portion 12D, which are provided at different positions along the path trajectory of the fuel path FL. The fueling device including the filler neck 10A of this embodiment also effectively reduces the occurrence of the fuel overflow after a stop of fueling. According to one modification, an enlarged-diameter circumferential wall portion in a spiral form may be provided between the enlarged-diameter circumferential wall portion 12U and the enlarged-diameter circumferential wall portion 12D to from a space of a predetermined volume.

Figure 8:
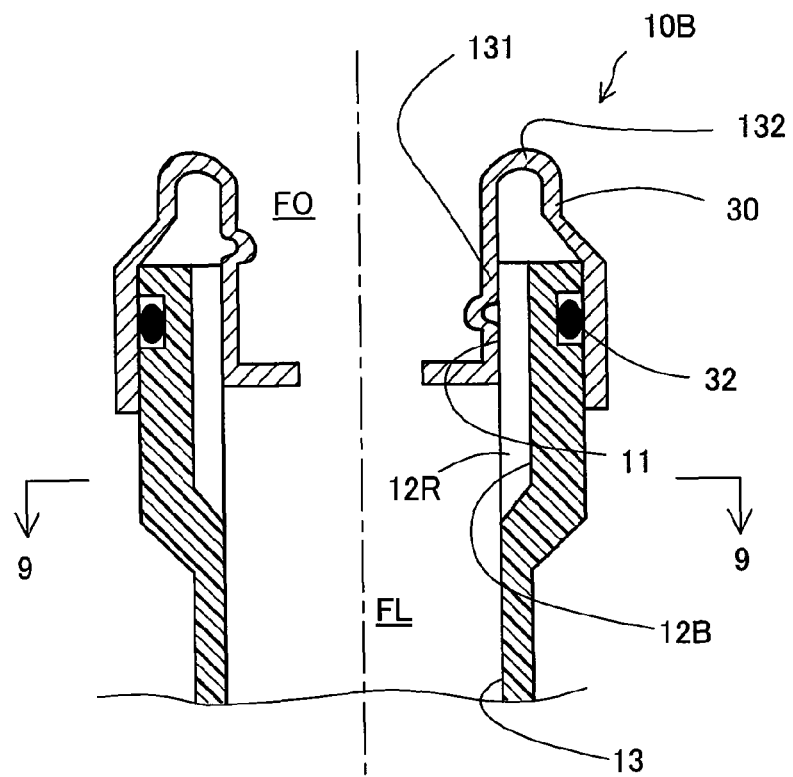
FIG. 8 is a diagram illustrating the vertical section of a main part of a filler neck in a fueling device according to a third embodiment.
Figure 9:
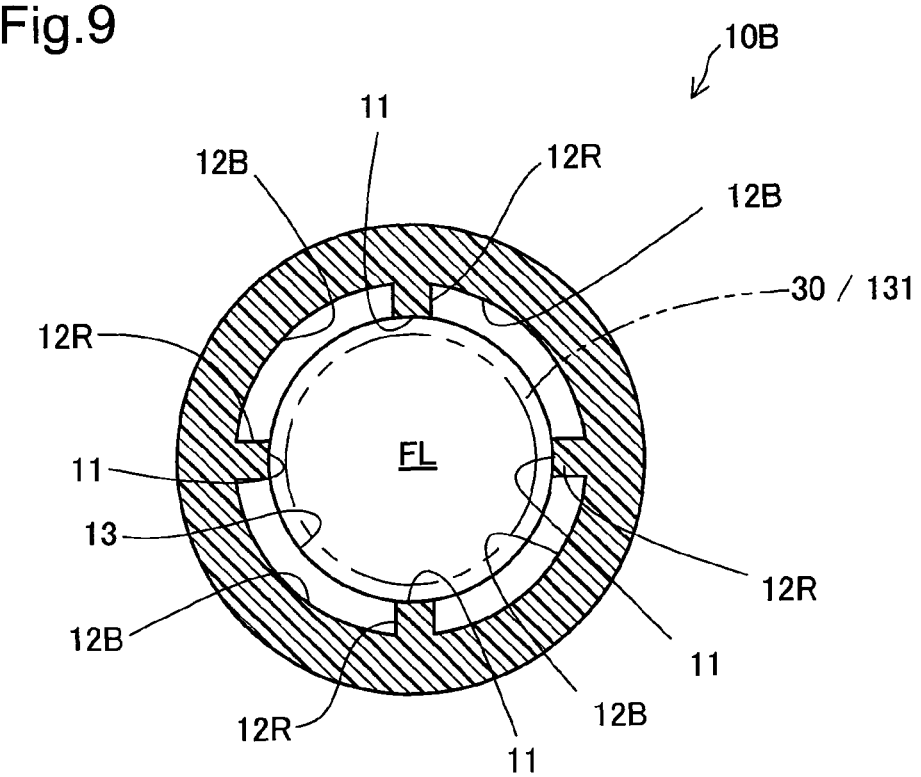
FIG. 9 is a diagram illustrating the filler neck of the third embodiment in the sectional view taken on a line 9-9 in FIG. 8.

FIG. 8 is a diagram illustrating the vertical section of a main part of a filler neck 10B in a fueling device according to a third embodiment. FIG. 9 is a diagram illustrating the filler neck 10B in the sectional view taken on a line 9-9 in FIG. 8.

As illustrated, the filler neck 10B has an enlarged-diameter circumferential wall portion 12B extended to an opening-side path circumferential wall 11. The filler neck 10B has a plurality of ribs 12R that are formed along the fuel path FL in the opening-side path circumferential wall 11 which the enlarged-diameter circumferential wall portion 12B is extended to. The plurality of ribs 12R serve to hold a retainer 30 that covers an end of the opening-side path circumferential wall 11. As shown in FIG. 9, the inner periphery of each of the plurality of ribs 12R is formed in an arc shape that overlaps the inner circumferential wall surface of the opening-side path circumferential wall 11 to hold the retainer 30. The retainer 30 held by the ribs 12R has an inner wall-side region 131 of the filler port FO and a top region 132 surrounding the filler port FO. The shape and the dimensions of these regions 131 and 132 are identical with those of an existing retainer of the conventional structure. In the fueling device including the filler neck 10B of this embodiment, the enlarged-diameter circumferential wall portion 12B is extended in a wider range to the opening-side path circumferential wall 11. This increases the capacity for receiving the fuel flowing into the space formed by the enlarged-diameter circumferential wall portion 12B. This more effectively reduces the occurrence of the fuel overflow after a stop of fueling. When the fuel gun FG is drawn out of the filler port FO, the fuel flowing into the space formed by the enlarged-diameter circumferential wall portion 12B is quickly collected into the fuel path FL. In the fueling device including the filler neck 10B of this embodiment, the inner peripheral shape of each of the ribs 12R is the arc shape that overlaps the inner circumferential wall surface of the opening-side path circumferential wall 11. The retainer 30 is held by the inner periphery of these ribs 12R. This does not require a change in dimensions of the inner wall region 131 or the top region 132 of the retainer 30. This accordingly does not reduce the commonality of the retainer 30.

Figure 10:
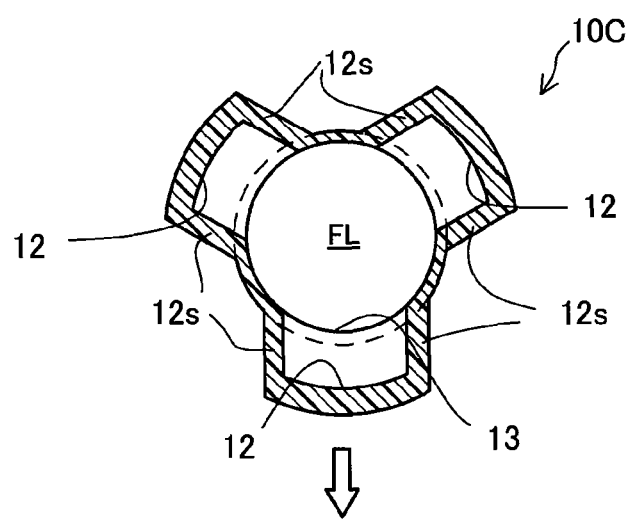
FIG. 10 is a diagram illustrating the sectional view of a main part of a filler neck in a fueling device according to a fourth embodiment, in a manner corresponding to FIG. 3C.
Figure 11:
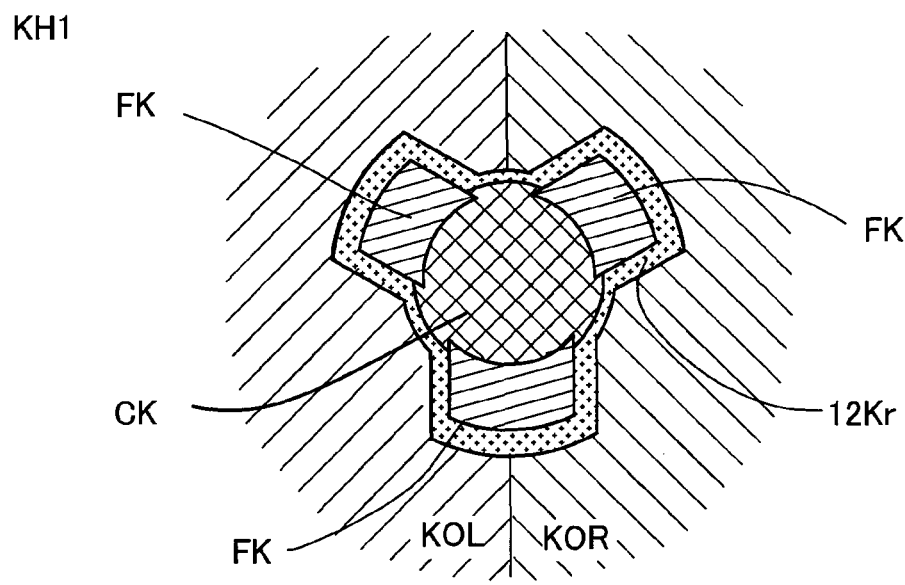
FIG. 11 is a diagram schematically illustrating a first process of removal of molds when the filler neck is molded by press molding or injection molding.
Figure 11:
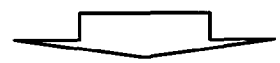
Figure 11:
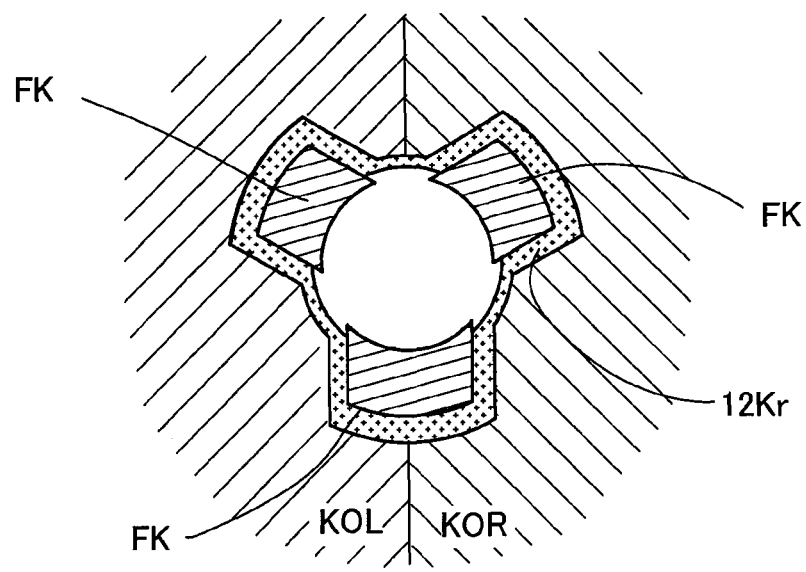
Figure 12:
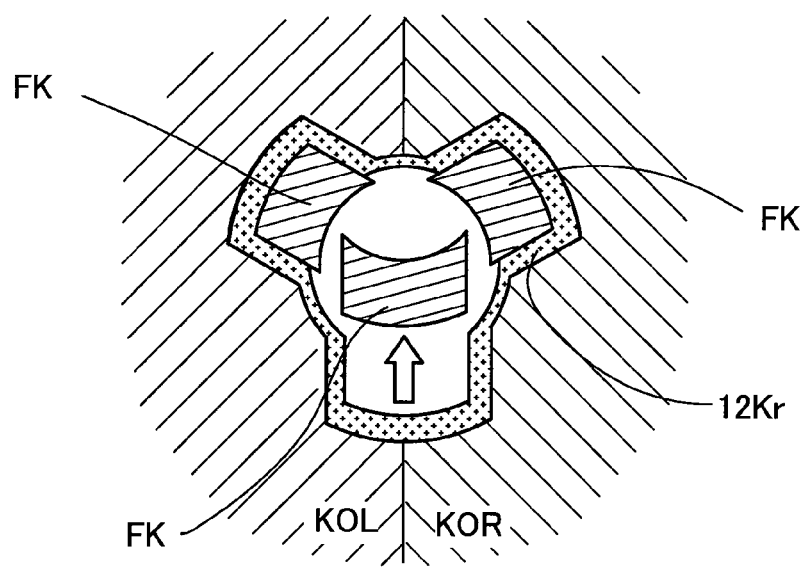
FIG. 12 is a diagram schematically illustrating a second process of removal of the molds.

FIG. 10 is a diagram illustrating the sectional view of a main part of a filler neck 10C in a fueling device according to a fourth embodiment, in a manner corresponding to FIG. 3C. FIG. 11 is a diagram schematically illustrating a first process of removal of molds when the filler neck 10C is molded by press molding or injection molding. FIG. 12 is a diagram schematically illustrating a second process of removal of the molds.

The sectional shape in the radial direction of an enlarged-diameter circumferential wall portion 12 of the filler neck 10C of the embodiment is similar to the sectional shape of the enlarged-diameter circumferential wall portion 12 of the filler neck 10 of the first embodiment shown in FIG. 3C. The configuration of the fourth embodiment, however, differs from the configuration of the first embodiment as described below and thereby facilitates molding. More specifically, as shown in FIG. 10, the filler neck 10C has side walls 12s that are arranged parallel to each other such as to face each other across the enlarged-diameter circumferential wall portion 12. This filler neck 10C is molded by using molds described below and is obtained by removal of the molds as described below. As shown in FIG. 11, split molds KOL and KOR, a center core mold CK and enlarged-diameter shaping core molds FK are used for shaping the filler neck 10C. Like the first embodiment described above, the split molds KOL and KOR have mold surfaces for shaping the outer shape of the opening-side path circumferential wall 11, the enlarged-diameter circumferential wall portion 12 and the downstream-side circumferential wall portion 13 of the filler neck 10C. These mold surfaces are combined with mold surfaces of the respective core molds to form cavities for the respective portions. The center core mold CK is split into a front-side split and a rear-side split relative to the sheet surface. The front-side split of the center core mold CK has a mold surface for shaping a circumferential-wall inner peripheral configuration of the opening-side path circumferential wall 11. The rear-side split of the center core mold CK has a mold surface for shaping a circumferential-wall inner peripheral configuration of the downstream-side circumferential wall portion 13. The front-side split and the rear-side split of the center core mold CK are combined with the enlarged-diameter shaping core molds FK, such that the core molds FK are placed between the front-side and the rear-side splits. The enlarged-diameter shaping core molds FK are combined with the split molds KOL and KOR to form an enlarged-diameter cavity 12Kr for shaping a circumferential-wall inner peripheral configuration of the enlarged-diameter circumferential wall portion 12. The enlarged-diameter shaping core molds FK have regions entering the center core mold CK, which are formed by extending toward the front side of the sheet surface.

In a mold removal first process KH1 shown in FIG. 11, the front-side split and the rear-side split of the center core mold CK are pulled out toward the front side and the rear side of the sheet surface. This makes the enlarged-diameter shaping core molds FK in a freely-movable state, and a hollow space is formed by removal of the center core mold CK, as shown in the bottom drawing of FIG. 11. Subsequently, as shown in FIG. 12, in a mold removal second process KH2, one of the enlarged-diameter shaping core molds FK is moved toward the hollow space and is pulled out toward the front side of the sheet surface. The remaining enlarged-diameter shaping core molds FK are sequentially moved toward the hollow space and are pulled out toward the front side of the sheet surface. This completes removal of the molds. This provides the filler neck 10C having the enlarged-diameter circumferential wall portion 12 of the configuration shown in FIG. 10. A procedure of newly producing the filler neck 10C assembles the molds in the reverse sequence to that of mold removal described above, sets the respective molds as shown in the top drawing of FIG. 11 and injects a resin into the cavity.

The fueling device FS of this embodiment having the filler neck 10C of the above configuration similarly has the advantageous effects described above. Additionally, the configuration of the filler neck 10C of this embodiment simplifies the mold structure and facilitates the process of removing the molds.

The invention is not limited to the embodiments described above but may be implemented by a diversity of other configurations without departing from the scope of the invention. For example, the technical features of the embodiments corresponding to the technical features of the respective aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

In any of the filler necks 10, 10A, 10B and 10C of the above embodiments, the retainer 30 is mounted to the filler port FO-side and is held by the opening-side path circumferential wall 11. This configuration is, however, not restrictive. For example, a fueling mechanism of a capless structure may be mounted to the filler port FO-side and held by the opening-side path circumferential wall 11.

In any of the filler necks 10, 10A, 10B and 10C of the above embodiments, the enlarged-diameter circumferential wall portion 12 having the enlarged sectional area or enlarged volume of the fuel path is formed to be continuous with the opening-side path circumferential wall 11. According to one modification, the opening-side path circumferential wall 11 may be tapered on the downstream side of the fuel path to form a reduced diameter portion and then enlarged on the downstream side of the reduced diameter portion to form the enlarged-diameter circumferential wall portion 12. According to another preferable configuration, the angle of the inclined part on the downstream side of the enlarged-diameter circumferential wall portion 12 (shown in FIG. 2) may be further increased, such that the fuel accumulated in the space formed by the enlarged-diameter circumferential wall portion 12 is more likely to be returned to the fuel path FL. The fuel path FL of the fueling device FS is often inclined to the vertical direction as shown in FIG. 1, so that the angle of inclination of the inclined part may be determined according to the angle of inclination of the fuel path FL.

What is claimed is:

1. A fueling device that is configured to supply fuel to a fuel tank, the fueling device comprising:
    a filler neck consisting of a resin that forms a fuel path region within a fuel path, the fuel path extending from a filler port for the fuel to the fuel tank; and
    a mounting member that is mounted to a filler port side of the filler neck and configured to receive a fuel gun, wherein
    the filler neck includes an enlarged-diameter circumferential wall portion that is provided upstream of a position where a leading end of a fuel gun inserted from the mounting member at the filler port is placed, and the enlarged-diameter circumferential wall portion is enlarged outward in a radial direction relative to an opening-side path circumferential wall which is a fuel path circumferential wall on the filler port side and increases a volume of the fuel path,
    at least a part of the enlarged-diameter circumferential wall portion of the filler neck is surrounded by a lower part of the mounting member,
    the enlarged-diameter circumferential wall portion of the filler neck extends to the opening-side path circumferential wall,
    the mounting member is held by a plurality of ribs in a region of the filler neck containing the enlarged-diameter circumferential wall portion,
    the plurality of ribs is a part of the filler neck and protrudes inwardly from the enlarged-diameter circumferential wall portion of the filler neck, and
    the plurality of ribs extends lengthwise along the fuel path.

2. The fueling device according to claim 1, wherein an inner peripheral shape of each rib of the plurality of ribs is an arc shape that overlaps an inner circumferential wall surface of the opening-side path circumferential wall.

3. The fueling device according to claim 2, wherein the mounting member is made of a metal material.

4. The fueling device according to claim 1, wherein the mounting member is made of a metal material.

5. The fueling device according to claim 1, wherein each rib of the plurality of ribs extends separately from another rib of the plurality of ribs.

6. A fueling device for supplying fuel to a fuel tank, the fueling device comprising:
    a fuel path extending from a filler port to the fuel tank, the filler port being configured to receive a fuel gun for supplying fuel to the fuel tank through the fuel path;
    a mounting member mounted to the filler port of the fuel path and configured to receive a fuel gun; and
    a filler neck contained within a portion of the fuel path and consisting of a resin, the filler neck being arranged at a location of the fuel path into which a leading end of a fuel gun extends during fueling and providing a fuel path region having a larger volume than other portions of the fuel path not contained within the fuel path region,
    wherein the portion of the fuel path having a larger volume includes a circumferential wall portion extending outward in a radial direction of the fuel path and has a radius larger than a radius of other circumferential wall portions of the fuel path not contained within the fuel path region, and
    the portion of the fuel path having a larger volume is provided from an opening-side path of the circumferential wall portion on an upstream side of the leading end of a fuel gun during fueling,
    the mounting member is held by a plurality of ribs provided in the portion of the fuel path having a larger volume,
    each rib of the plurality of ribs is a part of the filler neck and protrudes inwardly from the circumferential wall portion separately from another rib of the plurality of ribs, and
    the plurality of ribs extends lengthwise along the fuel path.

* * * * *